United States Patent
Homma et al.

(10) Patent No.: US 6,630,230 B2
(45) Date of Patent: Oct. 7, 2003

(54) POLYESTER RESIN COMPOSITION AND FILM USING THE SAME

(75) Inventors: Ken Homma, Kanagawa (JP); Nobukatsu Wakabayashi, Kanagawa (JP)

(73) Assignee: Mitsubishi Engineering Plastics Corporation, Tokyo (JP)

( * ) Notice: Subject to any disclaimer, the term of this patent is extended or adjusted under 35 U.S.C. 154(b) by 0 days.

(21) Appl. No.: 09/802,935

(22) Filed: Mar. 12, 2001

(65) Prior Publication Data

US 2001/0047063 A1 Nov. 29, 2001

Related U.S. Application Data

(63) Continuation-in-part of application No. 09/413,851, filed on Oct. 7, 1999, now abandoned.

(30) Foreign Application Priority Data

Oct. 9, 1998 (JP) .......................................... 10-287901

(51) Int. Cl.⁷ .............................................. C08L 67/02
(52) U.S. Cl. ....................................... 428/220; 525/444
(58) Field of Search ........................... 525/444; 428/220

(56) References Cited

U.S. PATENT DOCUMENTS

| | | |
|---|---|---|
| 4,070,417 A | 1/1978 | Isaka et al. |
| 4,963,418 A | 10/1990 | Isaka et al. |
| 5,270,390 A | 12/1993 | Shibuya et al. |

FOREIGN PATENT DOCUMENTS

| | | |
|---|---|---|
| EP | 0 437 942 A2 | 7/1991 |
| JP | 10-25351 | 1/1998 |
| JP | 10-46014 | 2/1998 |

*Primary Examiner*—Patricia A. Short
(74) *Attorney, Agent, or Firm*—Sughrue Mion, PLLC

(57) ABSTRACT

The object of the present invention is to provide a polyester resin composition which can provide a polyester film having a low minimum stretching temperature, and exhibiting excellent heat shrinkability at a lower temperature and flexibility. According to the present invention, there is provided a polyester resin composition comprising (a) an amorphous polyethylene terephthalate resin and (b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° C.

36 Claims, No Drawings

POLYESTER RESIN COMPOSITION AND FILM USING THE SAME

This is a continuation-in-part of application Ser. No. 09/413,851 filed Oct. 7, 1999, now abandoned.

FIELD OF THE INVENTION

The present invention relates to a polyester resin composition, more precisely a polyester resin composition which can provide a polyester film having a low minimum stretching temperature and excellent heat shrinkability and flexibility.

BACKGROUND OF THE INVENTION

Recently, polyethylene terephthalate films have been studied for use in heat-shrinkable labels mainly for PET bottles. It will be beneficial for the recycling of PET bottles, if labels are made of the same kind of resin as the bodies of the bottles. However, although polyethylene terephthalate films are excellent in heat resistance, mechanical properties, transparency and the like, they suffer poor elongation, which makes them likely to be torn, and insufficient shrinkability at a low temperature.

To overcome these problems, polyethylene terephthalate copolycondensated with various dicarboxylic acid components and/or glycol components has been studied. However, such a material has not necessarily provide sufficiently improved heat shrinkability at low temperature. Moreover, it has also been studied to improve flexibility and elongation of the resin by blending various elastomers. However, because addition of polyester elastomers even in a small amount makes the resin white, i.e., opaque, for example, this technique has not been practically used yet.

SUMMARY OF THE INVENTION

The object of the present invention is to provide a polyester resin composition which can provide a polyester film having a low minimum stretching temperature, and exhibiting excellent heat shrinkability and flexibility.

To achieve the aforementioned object, the present inventors earnestly conducted studies. As a result, it was found that a polyester resin composition comprising an amorphous polyethylene terephthalate resin in admixture with a particular polyester ether resin at a weight ratio of 97/3 to 50/50 could exhibit excellent properties, and thus the present invention has been accomplished.

That is, according to the present invention, there is provided a polyester resin composition comprising (a) an amorphous polyethylene terephthalate resin and (b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° C.

According to another aspect of the present invention, there is provided a polyester film which is composed of a blended resin comprising (a) an amorphous polyethylene terephthalate resin and (b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° c.

Preferably, the aromatic dicarboxylic acid is terephthalic acid.

The C2–c6 alkylene glycol is preferably ethylene glycol or tetramethylene glycol, more preferably tetramethylene glycol.

The poly(C2–C4 alkylene oxide) glycol is preferably polytetramethylene oxide glycol.

The segments derived from poly(C2–C4 alkylene oxide) glycol preferably constitute 3 to 20% by weight of the polyester ether resin (b).

According to embodiments of the present invention, there are provided a polyester resin composition comprising (a) an amorphous polyethylene terephthalate resin and (b) a polyester ether resin in admixture at a weight ratio of 97/3 to 50/50, wherein the polyester ether resin (b) is prepared by copolycondensation of dicarboxylic acid and/or ester derivative thereof consisting mainly of terephthalic acid and/or ester derivative thereof, and diols consisting mainly of tetramethylene glycol and polytetramethylene oxide glycol, and segments derived from the polytetramethylene oxide glycol constitute 1 to 30% by weight of the polyester ether resin, and the polyester ether resin (b) has a peak temperature of tan δ of 20 to 60° C.; and a polyester film which is composed of a blended resin comprising (a) an amorphous polyethylene terephthalate resin and (b) a polyester ether resin in admixture at a weight ratio of 97/3 to 50/50, wherein the polyester ether resin (b) is prepared by copolycondensation of dicarboxylic acid and/or ester derivative thereof consisting mainly of terephthalic acid and/or ester derivative thereof, and diols consisting mainly of tetramethylene glycol and polytetramethylene oxide glycol, and segments derived from the polytetramethylene oxide glycol constitute 1 to 30% by weight of the polyester ether resin, and the polyester ether resin (b) has a peak temperature of tan δ of 20 to 60° C.

According to the present invention, the amorphous polyethylene terephthalate resin (a) preferably has a glass transition temperature of 50° C. or higher.

According to the present invention, the poly(C2–C4 alkylene oxide) glycol preferably has a number average molecular weight of 500 to 6,000.

According to the present invention, the polyester ether resin preferably has a melting point of 200 to 240° C.

According to the present invention, the polyester ether resin preferably has a melt viscosity of 500 to 30,000 poises as measured at a temperature of 250° C. under a shear rate of 91.2 $sec^{-1}$.

According to the present invention, the polyester ether resin preferably has a peak temperature of tan δ of 20 to 60° C.

The polyester film of the present invention is preferably a heat-shrinkable film.

The polyester film of the present invention preferably has a heat shrinking ratio of 15% or more along the main shrinking direction, and less than 15% along the direction perpendicular to the main shrinking direction at 70° C.

The polyester film of the present invention preferably has a thickness of 3 to 500 μm, more preferably 20 to 200 μm.

PREFERRED EMBODIMENTS OF THE INVENTION

Embodiments and methods for practice of the present invention will be explained in detail hereinafter.

The component (a) of an amorphous polyethylene terephthalate resin used for the present invention may be, for example, a polyester resin produced by copolycondensation of a component consisting of terephthalic acid or ester derivative thereof and an ethylene glycol component, together with a component consisting of one or more other dicarboxylic acids or ester derivatives thereof and/or one or more other glycol components, i.e., an amorphous co-PET resin.

Specific examples of the amorphous polyethylene terephthalate resin include, for example, polyester resins produced by copolycondensation of terephthalic acid, ethylene glycol, and a dicarboxylic acid other than terephthalic acid, polyester resins produced by copolycondensation of terephthalic acid, ethylene glycol, and a glycol other than ethylene glycol, polyester resins produced by copolycondensation of terephthalic acid, ethylene glycol, a dicarboxylic acid other than terephthalic acid, and a glycol other than ethylene glycol and the like. One kind of the amorphous polyethylene terephthalate resin may be used alone, or two or more kinds of the resin may be used in combination.

Examples of the aforementioned dicarboxylic acid component other than terephthalic acid include, for example, components consisting of aromatic dicarboxylic acids, alicyclic dicarboxylic acids, aliphatic dicarboxylic acids, ester derivatives thereof and the like. Mixtures thereof may also be used. As the aromatic dicarboxylic acids, there can be mentioned isophthalic acid, phthalic acid, 2,6-naphthalenedicarboxylic acid, 1,5-naphthalenedicarboxylic acid, bis(4,4'-carboxyphenyl)methane, anthracenedicarboxylic acid, (4,4'-diphenyl ether)dicarboxylic acid and the like. As the alicyclic dicarboxylic acid, there can be mentioned 1,4-cyclohexanedicarboxylic acid, 4,4'-dicyclohexyldicarboxylic acid and the like.

Examples of the aliphatic dicarboxylic acid include, for example, adipic acid, sebacic acid, azelaic acid, dimer acids and the like. Preferred examples of the dicarboxylic acid component other than terephthalic acid include, for example, isophthalic acid and ester derivatives thereof. The dicarboxylic acid component in the amorphous polyethylene terephthalate resin preferably comprises 60% by mol or more of aromatic dicarboxylic acid component, more preferably 60% by mol or more of terephthalic acid component in view of mechanical properties and heat resistance.

Examples of the glycol component other than ethylene glycol include, for example, 1,4-cyclohexane dimethanol, propylene glycol, 1,5-pentanediol, 1,6-hexanediol, neopentyl glycol, decamethylene glycol, 4,4'-dihydroxycyclohexylmethane, 4,4'-dihydroxycyclohexylpropane, ethylene oxide adducted bisphenol A, polyethylene oxide glycol, polypropylene oxide glycol and the like. Any mixtures thereof may also be used.

The amorphous polyethylene terephthalate resin preferably has a glass transition temperature of 50° C. or higher. If the glass transition temperature of the amorphous polyethylene terephthalate resin is lower than 50° C., the heat resistance is likely to be degraded. The glass transition temperature of the amorphous polyethylene terephthalate resin is more preferably 60° C. or more.

The component (b) of polyester ether resin used for the present invention is a polyester ether resin which is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol.

As the dicarboxylic acid (b1), there may be used aromatic dicarboxylic acids such as terephthalic acid, isophthalic acid, phthalic acid, 2,6-naphthalenedicarboxylic acid, 1,5-naphthalenedicarboxylic acid, bis(4,4'-carboxyphenyl)methane, anthracenedicarboxylic acid and (4,4'-diphenyl ether)dicarboxylic acid, and ester derivatives thereof, as well as alicyclic dicarboxylic acids such as 1,4-cyclohexanedicarboxylic acid, and 4,4'-dicyclohexyldicarboxylic acid, and aliphatic dicarboxylic acids such as adipic acid, sebacic acid, azelaic acid and dimer acids, and ester derivatives thereof and the like. The dicarboxylic acid component preferably comprises 70% by mol or more of aromatic dicarboxylic acid, more preferably 70% by mol or more of terephthalic acid in view of mechanical properties and heat resistance.

As the diol (b2), C2–C20 aliphatic diols, alicyclic diols, bisphenol derivatives and the like may be used in addition to the C2–C6 alkylene glycol and the poly(C2–C4 alkylene oxide) glycol. Examples of the diol (b2) include, for example, tetramethylene glycol, polytetramethylene oxide glycol, ethylene glycol, propylene glycol, 1,5-pentanediol, 1,6-hexanediol, neopentyl glycol, decamethylene glycol, 1,4-cyclohexane dimethanol, 4,4'-dihydroxycyclohexylmethane, 4,4'-dihydroxycyclohexylpropane, ethylene oxide adducted bisphenol A, polyethylene oxide glycol, polypropylene oxide glycol, mixtures thereof and the like. These may contain trihydric alcohols such as glycerin and trimethylol propane in an amount of 3% by mol or less of the diol component. If the amount of the trihydric alcohol exceeds 3% by mol, the component may be gelled, and thus it is not preferred. The diol component preferably comprises 70% by mol or more, more preferably 90% by mol or more of the C2–C6 alkylene glycol and the poly(C2–C4 alkylene oxide) glycol.

The amount of segments derived from the poly(C2–C4 alkylene oxide) glycol in the polyester ether resin is 1 to 30% by weight, preferably 3 to 20% by weight, more preferably 5 to 17%, still more preferably 10 to 17% by weight, most preferably 10 to 15% by weight of the polyester ether resin.

If the amount of segments derived from the poly (C2–C4 alkylene oxide) glycol in the polyester resin is more than 30% by weight, transparency of the polyester film becomes lower. Such film cannot produce, for example, labels for PET bottles which provide sufficient aesthetic impression. In the process of producing the film, the stretched film may shrink during storage to produce a deformed label or a label which is not shrinkable to a predetermined size. After the label shrinks on a bottle such as a PET bottle, the label may soften and loosen on the bottle.

The amount of segments derived from the poly(C2–C4 alkylene oxide) glycol in the polyester resin composition is preferably 0.05 to 15% by weight, more preferably 2 to 10% by weight of the composition. If the amount of segments derived from the poly(C2–C4 alkylene oxide) glycol is too small, flexibility and heat shrinkability at a lower temperature of the polyester film becomes poor. If it is too large, heat resistance of the polyester film tends to be degraded.

The number average molecular weight of the poly(C2–C4 alkylene oxide) glycol is preferably 500 to 6,000, more preferably 600 to 2,000. If the number average molecular weight is too small, flexibility of the polyester film becomes insufficient. If the number average molecular weight is too large, compatibility is degraded, and transparency of the polyester film becomes insufficient. The number average molecular weight of a poly(C2–C4 alkylene oxide) glycol is determined by reacting the poly(C2–C4 alkylene oxide) glycol with an excess amount of phthalic anhydride and quantifying unreacted phthalic anhydride to calculate an amount of hydroxyl group per 1 g of the poly(C2–C4 alkylene oxide) glycol.

The polyester ether resin used in the present invention preferably has a melting point of 200 to 240° C., more preferably, 200 to 230° C., further preferably 210 to 225° C. If the melting point of the polyester ether resin is too low, heat resistance of the polyester film tends to be degraded. If it is too high, flexibility of the polyester film tends to be insufficient. The polyester ether resin preferably has a melt viscosity of 500 poises to 30,000 poises, more preferably 1,000 poises to 20,000 poises as measured at 250° C. and 91.2 sec$^{-1}$. If the melt viscosity is too low, extrusion moldability of the film is degraded, and flexibility of the film becomes insufficient. The polyester ether resin has a peak temperature of tan δ of 20 to 60° C., preferably 30 to 60° C., still preferably 40 to 60° C., as measured by Vibron (automatic dynamic visco-elastometer). If tan δ is too low, heat resistance and mechanical properties of the film tend to be degraded. If it is too high, flexibility and heat shrinkability at a lower temperature of the film tends to become insufficient.

In the present invention, polyester ether resin having a flexural modulus in elasticity of 0.5 to 0.9 GPa can be preferably used.

The amorphous polyethylene terephthalate resin (a) and the polyester ether resin (b) used in the present invention can be produced by conventional polycondensation methods well known to those skilled in the art. For example, for the production of polyester ether, terephthalic acid dimethyl ester can be mixed with tetramethylene glycol and polytetramethylene oxide glycol at a predetermined weight ratio, and subjected to transesterification reaction by heating at a temperature of about 150 to 250° C. in the presence of a catalyst such as an alcoholate, chloride or oxide of tin, titanium, zinc, manganese, germanium or the like while methanol is being distilled. Then, polycondensation can be carried out by heating at 200 to 280° C. under reduced pressure of 10 mmHg or lower to obtain a polyester ether. In this reaction step, a thermostabilizer and the like may also be added.

In this process, it is also possible to add polytetramethylene oxide glycol first, then perform the transesterification, then add tetramethylene glycol, and thereafter perform the polycondensation. It is also possible to directly polycondense terephthalic acid, tetramethylene glycol and polytetramethylene oxide glycol. Furthermore, a polyester ether having an increased molecular weight can be obtained by the so-called solid state polycondensation method, where resin pellets of the polyester ether obtained by the aforementioned melt state polycondensation are treated by heating at a high temperature of 170 to 210° C. under an inert gas flow.

The polyester resin composition of the present invention comprises (a) the amorphous polyethylene terephthalate resin and (b) the polyester ether resin in admixture. The mixing ratio of the amorphous polyethylene terephthalate resin (a) and the polyester ether resin (b) in the polyester resin composition is 97/3 to 50/50 in terms of a weight ratio. An amount of the amorphous polyethylene terephthalate resin exceeding 97% by weight gives insufficient heat shrinkability at a lower temperature, and an amount less than 50% by weight gives insufficient heat resistance. The mixing ratio of the component (a) an amorphous polyethylene terephthalate resin and the component (b) a polyester ether resin is preferably 90/10 to 55/45, more preferably 80/20 to 60/40 in terms of a weight ratio.

Examples of the polyester resin composition of the present invention include, for example, dry blends, melt blends and the like of the amorphous polyethylene terephthalate resin and the polyester ether resin. When dry blends or melt blends are produced, various auxiliaries such as an agent for imparting slipping property, lubricant, antioxidant, and colorant can be blended.

Examples of the agent for imparting slipping property include, for example, inorganic particles such as microparticles of silica, talc, kaolin, and calcium carbonate, organic polymer microparticles such as those of poly(meta)acrylic resin, polystyrene resin, and polytetrafluoroethylene resin, closs-linked microparticles of these organic polymers and the like. These particles preferably have a mean particle diameter of 0.1 to 10 μm. Examples of the lubricant include, for example, calcium stearate, sodium stearate, magnesium stearate and the like.

According to another aspect of the present invention, there is provided a polyester film that is composed of the polyester resin composition of the present invention. The polyester film of the present invention can be produced by molding the aforementioned polyester resin composition. The method for producing the polyester film is not particularly limited, and well-known techniques such as those utilizing T-die film-forming machine, inflation film-forming machine and the like may be used. An unstretched film preferably has a thickness of 60 to 300 μm, and has a tensile modulus of about 2,000 to 22,000 kg/cm$^2$ as measured with a film having a thickness of 25 μm.

In the production of polyester films, stretching process may be employed. Usual stretching methods comprise uniaxial or biaxial stretching after the film forming. While the stretching method is not particularly limited, uniaxial stretching, for example, uniaxial stretching along the direction perpendicular to the extrusion direction (main shrinking direction), is preferred for use in heat-shrinkable labels and the like. The stretching temperature is usually about 60 to 90° C., but stretching at a low temperature is preferred for obtaining high heat-shrinkage property. The stretch ratio is preferably about 3 to 5 times, but it is not particularly limited.

The polyester film preferably has a thickness of about 3 to 500 μm, more preferably about 5 to 300 μm, still more preferably about 20 to 200 μm, most preferably about 20 to 100 μm. In the case of a heat-shrinkable film, it is preferred that a prestretched film having a thickness of 60 to 300 μm is stretched to prepare a stretched film having a thickness of 20 to 100 μm.

The polyester film of the present invention is preferably a heat-shrinkable polyester film. Heat shrinking ratio of the polyester film of the present invention is preferably 15% or more, more preferably 17% or more along the main shrinking direction, and less than 15%, more preferably less than 13% along the direction perpendicular to the main shrinking direction at 70° C.

The present invention will be explained more specifically with reference to the following examples, which are intended to be mere illustration of the present invention. It will be apparent for those skilled in the art that various alterations, modifications, or improvements can be made on the examples without departing from the spirit of the present invention. Therefore, the scope of the present invention is no way limited by these examples.

EXAMPLES

The measurement methods used in the examples are mentioned below.

(1) Minimum Stretching Temperature:

using a Long stretching machine, stretching temperature was lowered stepwise by 5° C. from 100° C., and a lowest temperature affording a uniform film was determined as the minimum stretching temperature. A lower minimum stretching temperature is more preferred.

(2) Heat Shrinking Ratio:

Marking lines were provided on a sample with a distance of 100 mm and the film was cut into 15 mm width, and measurement was performed at various temperatures. Heating was performed for 1 minute by hot air flow at a temperature of 70° C., 80° C., or 90° C. (or 100° C. only for Comparative Example 4, or 120° C. only for Comparative Example 1) for each sample. In the evaluation, "TD" means the main shrinking direction and "MD" means the direction perpendicular to the main shrinking direction.

(3) Flexibility:

A strip was cut out from a film to have a length of 100 mm along the main shrinking direction and a width of 15 mm, and elongation was determined in an atmosphere at 23° C. and a tension speed of 200 mm/min with a distance between the chucks of 50 mm in accordance with ASTM D-882.

The materials used in the examples are listed below.

(a) An amorphous polyethylene terephthalate resin: copolycondensate of terephthalic acid, isophthalic acid, and ethylene glycol (glass transition temperatures; 73° C., referred to as "Amorphous PET-1" hereinafter)

(b) An amorphous polyethylene terephthalate resin: copolycondensate of terephthalic acid, ethylene glycol and 1,4-cyclohexane dimethanol (glass transition temperatures; 75° C., referred to as "Amorphous PET-2" hereinafter)

(c) A polyester ether resin: copolycondensate of terephthalic acid, tetramethylene glycol and polytetramethylene oxide glycol (melting points; 220° C., melt viscosity (at 250° C., 91.2 sec$^{-1}$); 3,800 poises, peak temperature of tan δ as measured by vibron; 51° C., ratio of segments derived from polytetramethylene oxide glycol; 10% by weight, number average molecular weight of polytetramethylene oxide glycol; 1,000, the flexural modulus in elasticity (JIS K6902, ASTM D 790-63); 0.8 GPa, referred to as "Polyester ether" hereinafter). The peak temperature of tan δ was determined with REOVIBRON DDV-2-EA manufactured by TOYO-BOWLDWIN Co. Ltd. (frequency for measurement; 110 Hz, rate of temperature rise: 2° c/min., sampling interval: 2° C./min.)

(d) Polyethylene terephthalate (intrinsic viscosity; 0.8 dl/g, referred to as "PET" hereinafter)

Example 1

90% by weight of Amorphous PET-1 and 10% by weight of Polyester ether were dry blended, and dried by using a hot air dryer at 120° C. for 8 hours. This was kneaded and extruded by using an extruder having a diameter of 40 mm φ (L/D=22) at a cylinder temperature of 250° C. and a die temperature of 240° C., and quenched by a casting roll to produce an prestretched film having a thickness of 160 μm. This film was stretched by a stretch ratio of 4 times along the transverse direction (main shrinking direction) under an atmosphere of the stretching temperature of 80° C. by using a Long stretching machine to obtain a uniaxially stretched film having a thickness of 40 μm. The evaluation results are shown in Table 1.

Examples 2 and 3

Uniaxially stretched films having a thickness of 40 μm were obtained in the same manner as in Example 1 except that the formulation ratio and the stretching temperature were changed as shown in Table 1. The evaluation results are shown in Table 1.

Example 4

45% by weight of Amorphous PET-1, 45% by weight of Amorphous PET-2 and 10% by weight of Polyester ether were dry blended, made into a film and stretched in the same manner as in Example 1. The film was formed at a cylinder temperature of 260° C. and a die temperature of 250° C., and stretched by a stretch ratio of 4 times along the transverse direction (main shrinking direction) under an atmosphere of the stretching temperature of 80° C. to obtain a uniaxially stretched film having a thickness of 40 μm. The evaluation results are shown in Table 1.

TABLE 1

|  | Example 1 | Example 2 | Example 3 | Example 4 |
|---|---|---|---|---|
| Amorphous PET-1 (parts by weight) | 90 | 80 | 70 | 45 |
| Amorphous PET-2 (parts by weight) |  |  |  | 45 |
| Polyester ether (parts by weight) | 10 | 20 | 30 | 10 |
| Minimum stretching temperature (° C.) | 70 | 60 | 60 | 75 |
| Heat shrinking ratio | (TD/MD) | (TD/MD) | (TD/MD) | (TD/MD) |
| 70° C. (%) | 22/0 | 21/0 | 20/0 | 20/0 |
| 80° C. (%) | 47/1 | 45/1 | 42/1 | 42/1 |
| 90° C. (%) | 62/2 | 60/2 | 53/2 | 52/2 |
| Elongation (%) | 130 | 140 | 150 | 125 |

Comparative Example 1

A film was formed from PET and stretched in the same manner as in Example 1. The film was formed at a cylinder temperature of 280° C. and a die temperature of 270° C., and stretched by a stretch ratio of 4 times along the transverse direction (main shrinking direction) at a stretching temperature of 80° C. to obtain a uniaxially stretched film having a thickness of 40 μm. The evaluation results are shown in Table 2.

Comparative Example 2

A film was formed from Amorphous PET-1 and stretched in the same manner as in Example 1. The film was formed at a cylinder temperature of 250° C. and a die temperature of 240° C., and stretched by a stretch ratio of 4 times along the transverse direction (main shrinking direction) at a stretching temperature of 80° C. to obtain a uniaxially stretched film having a thickness of 40 μm. The evaluation results are shown in Table 2.

Comparative Example 3

A film was formed from Amorphous PET-2 and stretched in the same manner as in Example 1. The film was formed at a cylinder temperature of 250° C. and a die temperature of 240° C., and stretched by a stretch ratio of 4 times along the transverse direction (main shrinking direction) at a stretching temperature of 90° C. to obtain a uniaxially stretched film having a thickness of 40 μm. The evaluation results are shown in Table 2.

Comparative Example 4

A film was formed from dry blended 80% by weight of PET used in Comparative Example 1 and 20% by weight of Polyester ether used in Examples 1 to 4, and stretched in the same manner as in Example 1. The film was formed under the same conditions as in Comparative Example 1, and a uniaxially stretched film having a thickness of 40 μm was obtained. The obtained film was whitely clouded, and thus poor in transparency. The evaluation results of this film are also shown in Table 2.

TABLE 2

|  | Comparative Example 1 | Comparative Example 2 | Comparative Example 3 | Comparative Example 4 |
|---|---|---|---|---|
| Amorphous PET-1 (parts by weight) |  | 100 |  |  |
| Amorphous PET-2 (parts by weight) |  |  | 100 |  |
| Polyester ether (parts by weight) |  |  |  | 20 |
| PET (parts by weight) | 100 |  |  | 80 |
| Minimum stretching temperature (° C.) | 80 | 80 | 90 | 70 |
| Heat shrinking ratio | (TD/MD) | (TD/MD) | (TD/MD) | (TD/MD) |
| 70° C. (%) | 0/0 | 13/0 | 8/0 | 6/0 |
| 80° C. (%) | 0/0 | 37/1 | 23/0 | 30/0 |
| 90° C. (%) | 1/0 | 47/2 | 40/1 | 48/2 |
| 100° C. (%) |  |  |  | 50/2 |
| 120° C. (%) | 10/2 |  |  |  |
| Elongation (%) | 60 | 120 | 70 | 110 |

The polyester resin composition of the present invention exhibits a low minimum stretching temperature, and polyester films formed from it show excellent low-temperature heat shrinkability and excellent general heat shrinkability as well as excellent flexibility, heat fusibility, and transparency. Therefore, polyester films produced from the polyester resin composition of the present invention are useful as labels, protection films, binding films and the like for containers such as plastics bottles and glass bottles, as well as protective films and binding films for electric and electronic components, machine parts and the like, and therefore they shows excellent usefulness in various fields.

What is claimed is:

1. A polyester resin composition consisting of
   (a) an amorphous polyethylene terephthalate resin,
   (b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° C., and optionally
   (c) an auxiliary selected from the group consisting of agents for imparting slipping property, lubricants, antioxidants and colorants.

2. The polyester resin composition of claim 1, wherein the aromatic dicarboxylic acid is terephthalic acid.

3. The polyester resin composition of claim 1, wherein the C2–C6 alkylene glycol is ethylene glycol or tetramethylene glycol.

4. The polyester resin composition of claim 3, wherein the C2–C6 alkylene glycol is tetramethylene glycol.

5. The polyester resin composition of claim 1, wherein the poly(C2–C4 alkylene oxide) glycol is polytetramethylene oxide glycol.

6. The polyester resin composition of claim 1, wherein the segments derived from the poly(C2–C4 alkylene oxide) glycol constitute 3 to 20% by weight of the polyester ether resin (b).

7. The polyester resin composition of claim 6, wherein the segments derived from the poly(C2–C4 alkylene oxide) glycol constitute 5 to 17% by weight of the polyester ether resin (b).

8. The polyester resin composition of claim 7, wherein the segments derived from the poly(C2–C4 alkylene oxide) glycol constitute 10 to 17% by weight of the polyester ether resin (b).

9. The polyester resin composition of claim 8, wherein the segments derived from the poly(C2–C4 alkylene oxide) glycol constitute 10 to 15% by weight of the polyester ether resin (b).

10. The polyester resin composition of claim 1, wherein the polyester ether resin (b) has a flexural modulus in elasticity of 0.5 to 0.9 GPa.

11. The polyester resin composition of claim 1, wherein the amorphous polyethylene terephthalate resin (a) has a glass transition temperature of 50° C. or higher.

12. The polyester resin composition of claim 1, wherein the poly(C2–C4 alkylene oxide) glycol has a number average molecular weight of 500 to 6,000.

13. The polyester resin composition of claim 1, wherein the polyester ether resin has a melting point of 200 to 240° C.

14. The polyester resin composition of claim 1, wherein the polyester ether resin has a melt viscosity of 500 to 30,000 poises as measured at a temperature of 250° C. under a shear rate of 91.2 sec$^{-1}$.

15. The polyester resin composition of claim 1, wherein the polyester ether resin has a peak temperature of tan δ of 30 to 60° C.

16. The polyester resin composition of claim 15, wherein the polyester ether resin has a peak temperature of tan δ of 40 to 60° C.

17. A polyester resin composition consisting of
   (a) an amorphous polyethylene terephthalate resin,
   (b) a polyester ether resin in admixture at a weight ratio of 97/3 to 50/50, wherein the polyester ether resin (b) is prepared by copolycondensation of dicarboxylic acid and/or ester derivative thereof consisting mainly of terephthalic acid and/or ester derivative thereof, and diols consisting mainly of tetramethylene glycol and polytetramethylene oxide glycol, and segments derived from the polytetramethylene oxide glycol constitute 1 to 30% by weight of the polyester ether resin, and the polyester ether resin (b) has a peak temperature of tan δ of 20 to 60° C., and optionally,
(c) an auxiliary selected from the group consisting of agents for imparting slipping property, lubricants, antioxidants and colorants.

18. A polyester film which is composed of a blended resin consisting of
(a) an amorphous polyethylene terephthalate resin,
(b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° C., and optionally,
(c) an auxiliary selected from the group consisting of agents for imparting slipping property, lubricants, antioxidants and colorants.

19. The polyester film of claim 18, wherein the aromatic dicarboxylic acid is terephthalic acid.

20. The polyester film of claim 18, wherein the C2–C6 alkylene glycol is ethylene glycol or tetramethylene glycol.

21. The polyester film of claim 20, wherein the C2–C6 alkylene glycol is tetramethylene glycol.

22. The polyester film of claim 18, wherein the poly(C2–C4 alkylene oxide) glycol is polytetramethylene oxide glycol.

23. The polyester film of claim 18, wherein the segments derived from the poly(C2–C4 alkylene oxide) glycol constitute 3 to 20% by weight of the polyester ether resin (b).

24. The polyester film of claim 18, which is a heat-shrinkable film.

25. The polyester film of claim 18, wherein the polyester film has a heat shrinking ratio of 15% or more along the main shrinking direction, and less than 15% along the direction perpendicular to the main shrinking direction at 70° C.

26. The polyester film of claim 18, wherein the amorphous polyethylene terephthalate resin (a) has a glass transition temperature of 50° C. or higher.

27. The polyester film of claim 18, wherein the poly(C2–C4 alkylene oxide) glycol has a number average molecular weight of 500 to 6,000.

28. The polyester film of claim 18, wherein the polyester ether resin has a melting point of 200 to 240° C.

29. The polyester film of claim 18, wherein the polyester ether resin has a melt viscosity of 500 to 30,000 poises as measured at a temperature of 250° C. under a shear rate of 91.2 $sec^{-1}$.

30. The polyester film of claim 18, wherein the polyester ether resin has a peak temperature of tan δ of 30 to 60° C.

31. The polyester film of claim 30, wherein the polyester ether resin has a peak temperature of tan δ of 40 to 60° C.

32. The polyester resin composition of claim 18, wherein the polyester ether resin (b) has a flexural modulus in elasticity of 0.5 to 0.9 GPa.

33. The polyester film of claim 18, wherein the polyester film has a thickness of 3 to 500 μm.

34. The polyester film of claim 33, wherein the polyester film has a thickness of 20 to 100 μm.

35. A polyester film which is composed of a blended resin consisting of
(a) an amorphous polyethylene terephthalate resin,
(b) a polyester ether resin in admixture at a weight ratio of 97/3 to 50/50, wherein the polyester ether resin (b) is prepared by copolycondensation of dicarboxylic acid and/or ester derivative thereof consisting mainly of terephthalic acid and/or ester derivative thereof, and diols consisting mainly of tetramethylene glycol and polytetramethylene oxide glycol, and segments derived from the polytetramethylene oxide glycol constitute 1 to 30% by weight of the polyester ether resin, and the polyester ether resin (b) has a peak temperature of tan δ of 20 to 60° C., and optionally,
(c) an auxiliary selected from the group consisting of agents for imparting slipping property, lubricants, antioxidants and colorants.

36. A heat-shrinkable label for PET bottles which is composed of a polyester resin composition consisting of
(a) an amorphous polyethylene terephthalate resin,
(b) a polyester ether resin in admixture at a weight ratio of 97/3 to 50/50, wherein the polyester ether resin (b) is prepared by copolycondensation of (b1) dicarboxylic acid and/or ester derivative thereof consisting mainly of an aromatic dicarboxylic acid and/or ester derivative thereof, and (b2) diols consisting mainly of a C2–C6 alkylene glycol and a poly(C2–C4 alkylene oxide) glycol, and segments derived from the poly(C2–C4 alkylene oxide) glycol constitute 1 to 30% by weight of the polyester ether resin (b), and the polyester ether resin (b) has a peak temperature of tan δ of 20 to 60° C., and optionally,
(c) an auxiliary selected from the group consisting of agents for imparting slipping property, lubricants, antioxidants and colorants.

* * * * *